(12) United States Patent
Yu et al.

(10) Patent No.: US 9,170,271 B2
(45) Date of Patent: Oct. 27, 2015

(54) ACCELEROMETER AND ITS FABRICATION TECHNIQUE

(71) Applicant: Chinese Academy of Sciences Institute of Geology and Geophysics, Beijing (CN)

(72) Inventors: Du Li Yu, Beijing (CN); Lian Zhong Yu, Beijing (CN); Chang Chun Yang, Beijing (CN)

(73) Assignee: Chinese Academy of Sciences Institute of Geology and Geophysics, Chaoyang District, Beijing (CN)

( * ) Notice: Subject to any disclaimer, the term of this patent is extended or adjusted under 35 U.S.C. 154(b) by 0 days.

(21) Appl. No.: 14/031,613

(22) Filed: Sep. 19, 2013

(65) Prior Publication Data

US 2014/0097508 A1     Apr. 10, 2014

(30) Foreign Application Priority Data

Sep. 21, 2012  (CN) .......................... 2012 1 0356922

(51) Int. Cl.
*H01L 29/84* (2006.01)
*G01P 15/125* (2006.01)
*G01P 15/08* (2006.01)

(52) U.S. Cl.
CPC ........... *G01P 15/125* (2013.01); *G01P 15/0802* (2013.01); *G01P 2015/0871* (2013.01)

(58) Field of Classification Search
CPC ................................................ H01H 59/0009
USPC ........................................................ 257/415
See application file for complete search history.

(56) References Cited

U.S. PATENT DOCUMENTS

| 6,805,008 | B2 |   | 10/2004 | Selvakumar et al. |
|-----------|----|---|---------|-------------------|
| 7,428,841 | B2 |   | 9/2008  | Harada et al. |
| 7,705,412 | B2 | * | 4/2010  | Kai ............................... 257/417 |
| 8,067,812 | B2 | * | 11/2011 | Kai ............................... 257/419 |
| 2002/0002864 | A1 | * | 1/2002  | Kvisteroey et al. ......... 73/504.12 |
| 2005/0217373 | A1 | * | 10/2005 | Ishikawa et al. ................ 73/493 |
| 2005/0268717 | A1 | * | 12/2005 | Ozawa ....................... 73/504.14 |

(Continued)

FOREIGN PATENT DOCUMENTS

| CN | 101545919 A | 9/2009 |
| CN | 101858929 A | 10/2010 |

(Continued)

OTHER PUBLICATIONS

International Search Report for Application No. PCT/CN2013/000828 Dated Oct. 7, 2013.
Written Opinion for Application No. PCT/CN2013/000828 Dated Oct. 10, 2013.

*Primary Examiner* — Jarrett Stark
*Assistant Examiner* — Mohammad M Hoque
(74) *Attorney, Agent, or Firm* — Dergosits & Noah LLP

(57) ABSTRACT

An accelerometer has E-shaped resilient beams to isolate stress and reduce deformation. A top cap silicon wafer and a bottom cap silicon wafer are both coupled with a measurement mass to form a capacitor. The measurement mass has a mass, range-of-motion stops, and resilient beams located within a support frame. The range-of-motion stops are coupled to the support frame by connection beams, and the mass is coupled with the range-of-motion stops by groups of E-shaped resilient beams. The ends of each resilient beam are connected to the range-of-motion stops, and the middle of each resilient beam is connected to the mass.

14 Claims, 6 Drawing Sheets

(56) References Cited

U.S. PATENT DOCUMENTS

2006/0130580 A1* 6/2006 Ikegami ............... 73/514.01
2006/0130584 A1* 6/2006 Ono et al. ............ 73/514.36
2007/0017289 A1* 1/2007 Sakamoto ............ 73/514.16
2009/0241671 A1* 10/2009 Nomura ............... 73/514.36
2010/0162823 A1* 7/2010 Hattori ..................... 73/774
2012/0140303 A1* 6/2012 Marxer et al. .......... 359/224.1

FOREIGN PATENT DOCUMENTS

| CN | 101858929 A | * | 10/2010 |
| CN | 202815009 U | | 3/2013 |
| JP | 2005-172808 A | | 6/2005 |
| JP | 2006-145258 A | | 6/2006 |

* cited by examiner

ACCELEROMETER AND ITS FABRICATION TECHNIQUE

CROSS-REFERENCE

This application claims priority from Chinese Patent Application No. 201210356922.7, filed Sep. 21, 2012 and entitled An Accelerometer and its Fabrication Technique, which is incorporated by reference in its entirety.

TECHNICAL FIELD

This invention relates to a sensor, particularly to an accelerometer.

BACKGROUND

Nowadays, accelerometers have been used in various applications, such as, measuring the magnitude of earthquake and gathering seismic data, detecting the magnitude of collision during a car collision, and detecting the tilting direction and angle of a mobile phone or a game console. As the micro-electro-mechanical systems (MEMS) technology continues to progress, many nano-scale accelerometers have been widely commercially used.

There are two kinds of accelerometers which are commonly used: piezo resistive accelerometers and capacitive accelerometers. Piezoresistive accelerometer, such as Chinese invention patent application with Publication No. CN1748146 and Publication Date of Mar. 15, 2006, usually comprises mass and beams; piezo elements are provided on the beam. The mass moves according to the acceleration, and causes the beam to deform, which also causes the change of resistance. However, under situations when there is no acceleration or the acceleration magnitude is relatively small, the beam will not deform significantly. And there is no significant change in resistance. The accelerometer can only detect acceleration when the magnitude of acceleration is large enough to cause the deformation of the beam. Therefore, such accelerometer has low accuracy.

Capacitive accelerator, such as U.S. Pat. No. 6,805,008, with Publication Date of Oct. 19, 2004, also includes beam and mass. When the acceleration is present, the frame of the accelerometer will move according to the acceleration direction, but due to inertia, there is little displacement for the mass. Thus, the gap distance change between the mass and another electrode causes a change in capacitance. Both kinds of accelerometers are manufactured by micro fabrication technique and have the characteristics of small size and low manufacturing cost. However, the beams are resilient beams, and there are only four beams connecting the mass with the frame. Thus, when the outer frame moves, the displacement of each beam is relatively large. Also, each beam will not create a uniform displacement and deformation, which leads to unsymmetrical vibrational modes.

Furthermore, when packaging the above-mentioned capacitive accelerometer with other microelectronic modules to form an integrated circuit, a package-induced stress is generated due to the difference of coefficients of thermal expansion between different materials. The package-induced stress will directly affect the performance of each component. Compared with other components, MEMS components is more sensible to package-induced stress due to its small size and moveable parts. The package-induced stress may cause a deformation of components in the accelerometer, which leads to inaccurate acceleration detection, and lowers the accelerometer's stability and reliability.

SUMMARY

The present invention is intended to overcome the shortages of the existing accelerometers, and to provide an accelerometer with low effect on package-induced stress and has relatively high stability and reliability.

The present invention provides an accelerometer, comprising a measurement mass, a top cap silicon wafer and a bottom cap silicon wafer which both are coupled with the said measurement mass; the measurement mass comprises a support frame, a mass, a plurality of range-of-motion stops and resilient beams. The mass, the range-of-motion stops and the resilient beams are located within the support frame; the range-of-motion stops are located away from the support frame, and coupled to the support frame by connection beams. The mass is coupled with the range-of-motion stops by resilient beams; there are several groups of resilient beams, each resilient beam has an E-shape structure; the two-end beams of each resilient beam are connected to the range-of-motion stops; and the middle beam of the resilient beam is connected to the mass.

The present invention also has the following additional features:

Several recesses are provided on the mass; there are several range-of-motion stops, each being located within the recess.

A gap is formed between the mass and each range-of-motion stop.

Each resilient beam is provided within the gap space between the support frame and the mass; the resilient beams can move freely within the gap space.

The middle beam of each resilient beam is located across the midline of the mass.

Each connection beam is provided at the corner of the range-of-motion stop; each connection beam is coupled with the internal corner of the frame.

The measurement mass has a double side silicon on insulator (SOI) structure, which includes top silicon layer, middle silicon layer, and bottom silicon layer; a silicon dioxide layer is provided between two silicon layers. The double side silicon on insulator structure is also referred as double side SOI structure.

A plurality of the resilient beams, the range-of-motion stops, and the connection beams are respectively symmetrically formed in the top silicon layer and the bottom silicon layer to compose a double layer structure.

Electrodes are respectively provided on the measurement mass, the top cap silicon wafer and the bottom cap silicon wafer.

In accordance with the present invention to provide a fabrication technique for the accelerometer, including the following steps:

Step 1, use photolithography, deep etching and etching to form a plurality of holes penetrating from the top silicon layer and bottom silicon layer to the middle silicon layer of the double side SOI silicon wafer;

Step 2, deposit polycrystalline silicon in the holes to fill up the holes in order to form an electric circuit; then grow a silicon dioxide layer on the surfaces of the top silicon layer and bottom silicon layer of the double side SOI silicon wafer; and polish the surface;

Step 3, use photolithography, deep etching and etching to form a plurality of resilient E-shaped beams, range-of-motion stops and connection beams in the top silicon layer and the bottom silicon layer of the double side SOI silicon wafer; then use thermal oxidation to grow silicon dioxide on the exposed surfaces of the resilient E-shaped beams, the range-of-motion stops and the connection beams; or use chemical vapor deposition (CVD) method to dispose a layer of silicon dioxide on the exposed surfaces of the resilient E-shaped beams, the range-of-motion stops and the connection beams;

Step 4, use photolithography and etching to remove the exposed silicon dioxide in on the middle silicon layer, and deep etch the middle silicon layer to a certain depth;

Step 5, simultaneously perform etching in the horizontal and vertical directions to the middle silicon layer located between the frame and the mass in order to form free-moving resilient beams;

Step 6, etching to remove the exposed silicon dioxide layer;

Step 7, perform a one-step bonding to the top cap silicon wafer, the processed double side SOI silicon wafer, and the bottom cap silicon wafer.

According to the present invention, the fabrication technique for the accelerometer further includes the following steps:

The fabrication technique for the top cap silicon wafer and bottom cap silicon wafer further comprises:

A. use photolithography, deep etching and etching to form a through hole on the top cap silicon wafer or the bottom cap silicon wafer;

B. use photolithography, deep etching and etching to respectively form a recess area on each bonding surface of the top cap silicon wafer and bottom cap silicon wafer;

C. clean the top cap wafer and bottom cap wafer before bonding with the double side SOI silicon wafer;

D. after bonding with the double side SOI silicon wafer, deposit metal on the surface of top cap silicon wafer and bottom cap silicon wafer to form electrodes; and deposit metal on the surface of double side SOI silicon wafer through the through hole formed on the top cap silicon wafer or bottom cap silicon wafer to form an electrode from the through hole.

In the fabrication technique disclosed in the present invention, the silicon dioxide layers serve the purpose of protecting the silicon layers, which are covered up by the silicon dioxide layers, from etching or corrosion.

The said depth etching and etching method includes one or more from the following methods: dry etching or wet etching; the said dry etching comprises: silicon deep reactive-ion etching and reactive-ion etching. The etchant for etching the silicon layer comprises one kind or a combination of the following etchants: potassium hydroxide, tetramethylammonium hydroxide, ethylenediamine pyrocatechol or gaseous xenon difluoride.

The etchant for etching the silicon dioxide layer comprises one kind or a combination of the following etchants: buffered hydrofluoric acid, 49% hydrofluoric acid or gaseous hydrogen fluoride. The said silicon dioxide layer can also be removed by reactive-ion etching of the dry etching method.

In accordance to the present invention, the accelerometer and its fabrication technique has the following advantages. First of all, by adding the range-of-motion stops between the mass and the support frame, the invention effectively reduces the effect of the package-induced stress on the mass and resilient beams during chip packaging, so as to improve the stability and reliability of the accelerometer. By adding the range-of-motion stops between the mass and the frame, the invention also reduces the effect of the stress generated by temperature and gas pressure in the working environment on the accelerometer. Also, the middle beams of the resilient beams cross through the midline of the mass, which endows the accelerometer with symmetrical and stable structure. Furthermore, the fabrication technique of the present accelerometer utilizes double side SOI silicon wafer and one-step bonding technique for three pieces of silicon wafer. By etching the resilient beam and the mass on the double side SOI silicon wafer, the components can be accurately aligned and forms a highly symmetrical structure. Compared with the prior art, which uses bonding technique to fabricate the dual-layer beams, the accelerometer fabricated by the present technique has high accuracy and small error; the throughput yield is also significantly increased. Since the etching technique is relatively simple, the present fabrication technique also has a high productive efficiency and low manufacturing cost.

DETAILED DESCRIPTION

The present invention will be described in further detail below with reference to the drawings and specific embodiments.

Figure 1:
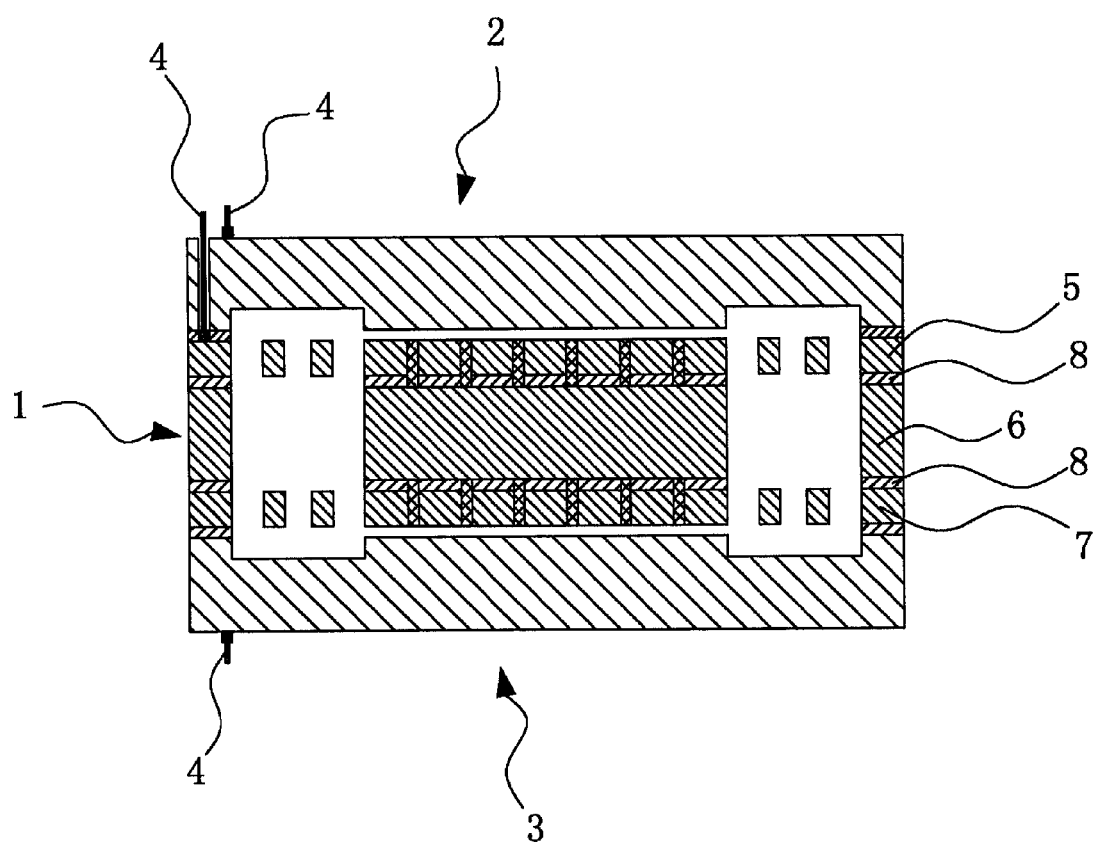
FIG. 1 is a structure scheme of the present invention.

With reference to FIG. 1, an accelerometer comprises: measurement mass 1, top cap silicon wafer 2 and bottom cap silicon wafer 3, which both are coupled with the measurement mass 1; electrodes 4 are respectively provided on the measurement mass 1, the top cap silicon wafer 2, and the bottom cap silicon wafer 3. The measurement mass 1 has a double side SOI structure, it comprises top silicon layer 5, middle silicon layer 6, and bottom silicon layer 7; silicon dioxide layers 8 are provided between two silicon layers.

Figure 2:
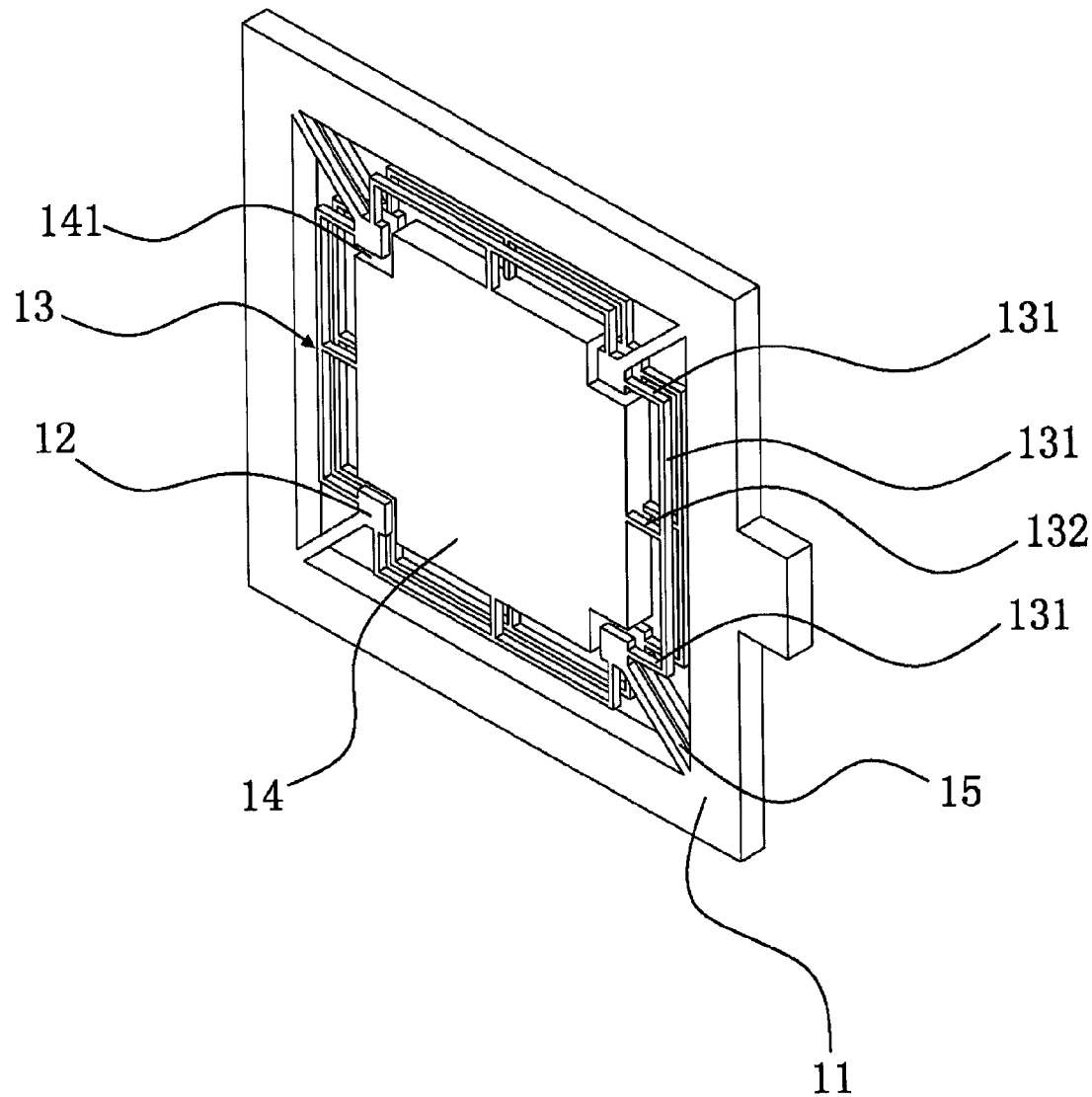
FIG. 2 is a perspective view of the measurement mass in the present invention.
Figure 3:
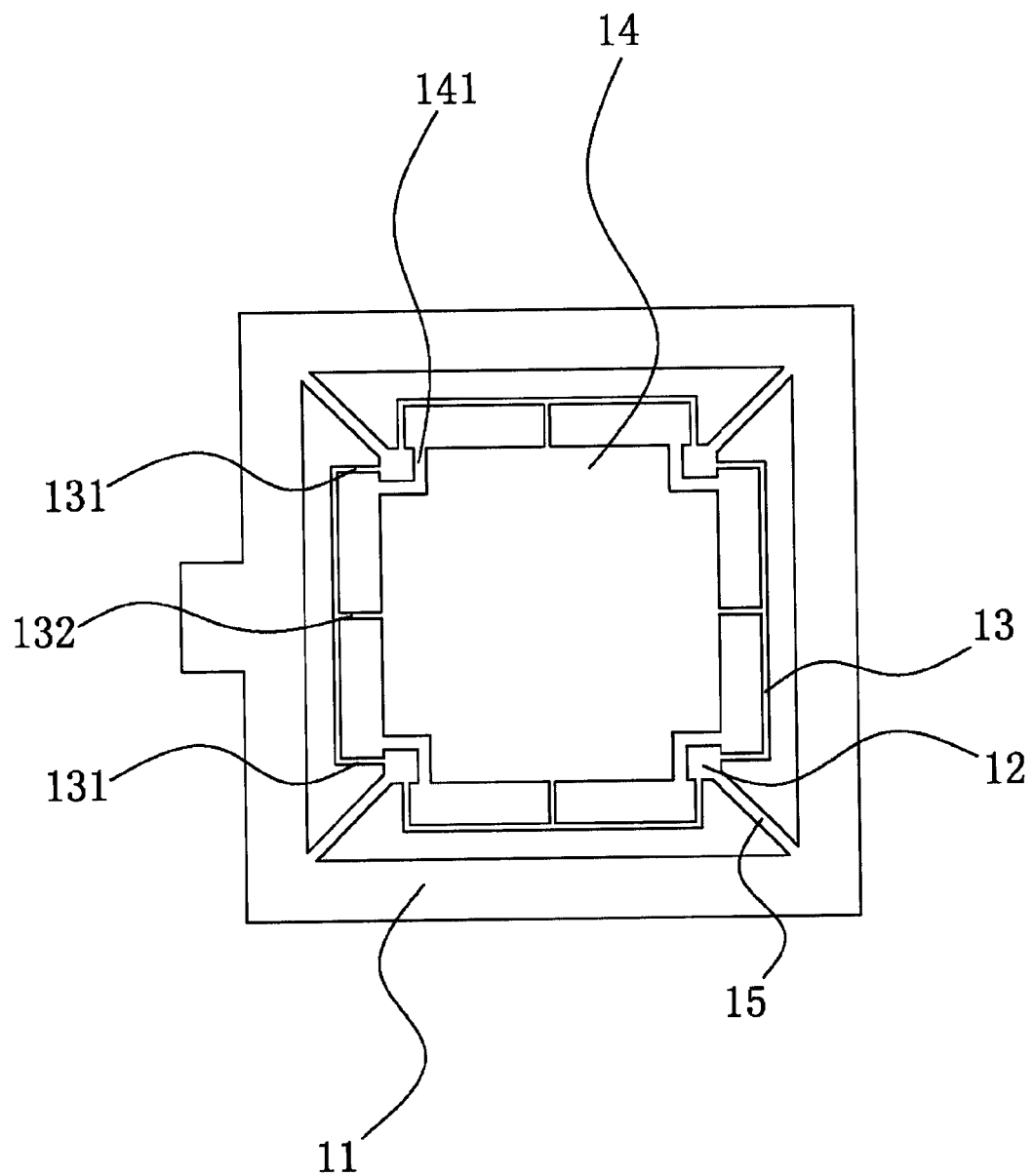
FIG. 3 is a top view of the measurement mass in the present invention.

With reference to FIGS. 2 and 3, the measurement mass 1 comprises support frame 11, a plurality of range-of-motion stops 12, resilient beams 13, and a mass 14. The range-of-motion stops 12, resilient beams 13 and mass 14 are located within the support frame 11; the range-of-motion stops 12 are located away from the support frame 11, and coupled with the support frame 11 by connection beams 15. The mass 14 is coupled with the range-of-motion stops 12 by resilient beams 13. There are several groups of resilient beams 13; each resilient beam 13 has an E-shape structure, the two side beams 131 of each resilient beam 13 are connected to the range-of-motion stops 12; and the middle beam 132 of the resilient beam 13 is connected to the mass 14. Several recesses 141 are provided on the mass 14. There are several range-of-motion stops 12; and each range-of-motion stop 12 is located within the recess 141; A gap is also formed between the mass 14 and each range-of-motion stop 12.

With reference to FIGS. 1 and 2, the measurement mass 1 can be separated into top silicon layer 5, middle silicon layer 6, and bottom silicon layer 7. Multiple groups of range-of-motion stops 12, resilient beams 13, and connection beams 15 are respectively symmetrically formed in the top silicon layer 5 and the bottom silicon layer 7.

With reference to FIGS. 2 and 3, preferably, the mass 14 is a rectangular body. The resilient beams 13 are provided within the gap space between the support frame 11 and the mass 14; the resilient beams 13 can move freely within the gap space. Each resilient beam 13 has an E-shape structure. Preferably, each layer contains four groups of resilient beams 13, range-of-motion stops 12, and connection beams 15. Each group of resilient beam 13 is respectively provided along four sides of the mass 14. Within each group, the two-end beams 131 of the resilient beam 13 are coupled with the range-of-motion stops; and the middle beam 132 of the resilient beam 13 is coupled with the mass 14. Each middle beam 132 is located across the midline of the mass 14. Each connection beam 15 is respectively provided at the corner of the range-of-motion stop 12, and coupled with the internal corner of the support frame 11. The overall structure of the measurement mass 1 is symmetrical, which makes the overall design more balanced, stable, and more accurate for measuring the direction of acceleration. The shape of the mass 14 in the present invention however is not limited to a rectangular shape; it can also be other shapes, such as hexagon, octagon, circle, etc. The arrangement of resilient beams 13, range-of-motion stops 12, and connection beams 15 are also not limited to a two layer structure, where each layer contains four groups of resilient beams 13, range-of-motion stops 12, and connection beams 15; it can also be a structure containing multiple layers and multiple groups.

With reference to FIGS. 1 and 2, during the acceleration measurement process, the support frame 11 will displace towards the acceleration direction. The resilient beams 13 will also have a certain amount of displacement. However, due to inertia, the magnitude of displacement of the mass 14 is relatively small. According to equation $C=\epsilon A/d$, where the capacitance between two parallel conductive plates equal to the permittivity of material ($\epsilon$) times area (A) divide by the separation distance (d). When displacement is generated due to acceleration, the distance between the mass 14, the top cap silicon wafer 2 and bottom cap silicon wafer 3 changes. Therefore, the capacitance between the measurement mass 1, the top cap silicon wafer 2 and the bottom cap silicon wafer 3 also changes. The integrated circuit can calculate the measured acceleration based on the change of capacitance. After the acceleration disappears, the resilient beams 13 will return to its original state, which returns the capacitance between the mass 14, the top cap silicon wafer 2 and the bottom cap silicon wafer 3 to a constant value.

With reference to FIGS. 2 and 3, during the packaging process of the accelerometer, the support frame 11 will experience the maximum amount of package-induced stress, and may be easily deformed. The present invention provides connection beams 15, which are connected to the range-of-motion stops 12, on the four internal corners of the support frame 11. Even if the support frame 11 deforms due to the package-induced stress, and the connection beams 15 may also deform by a certain amount, the deformation will not affect the range-of-motion stops 12 since the connection beams 15 are resilient. The deformation certainly will not affect the mass 14 and the resilient beams 13 connected to the mass 14. Thus, the capacitance between the mass 14, the top cap silicon wafer 2, and the bottom cap silicon wafer 3 is relatively stable. When there is no acceleration, the capacitance between the mass 14, the top cap silicon wafer 2, and the bottom cap silicon wafer 3 is constant and equal. When there is acceleration, the displacement of each resilient beam 13 is mostly uniform. The accelerometer is capable of measuring vibration and acceleration more effectively and providing more accurate measurements.

Figure 4:
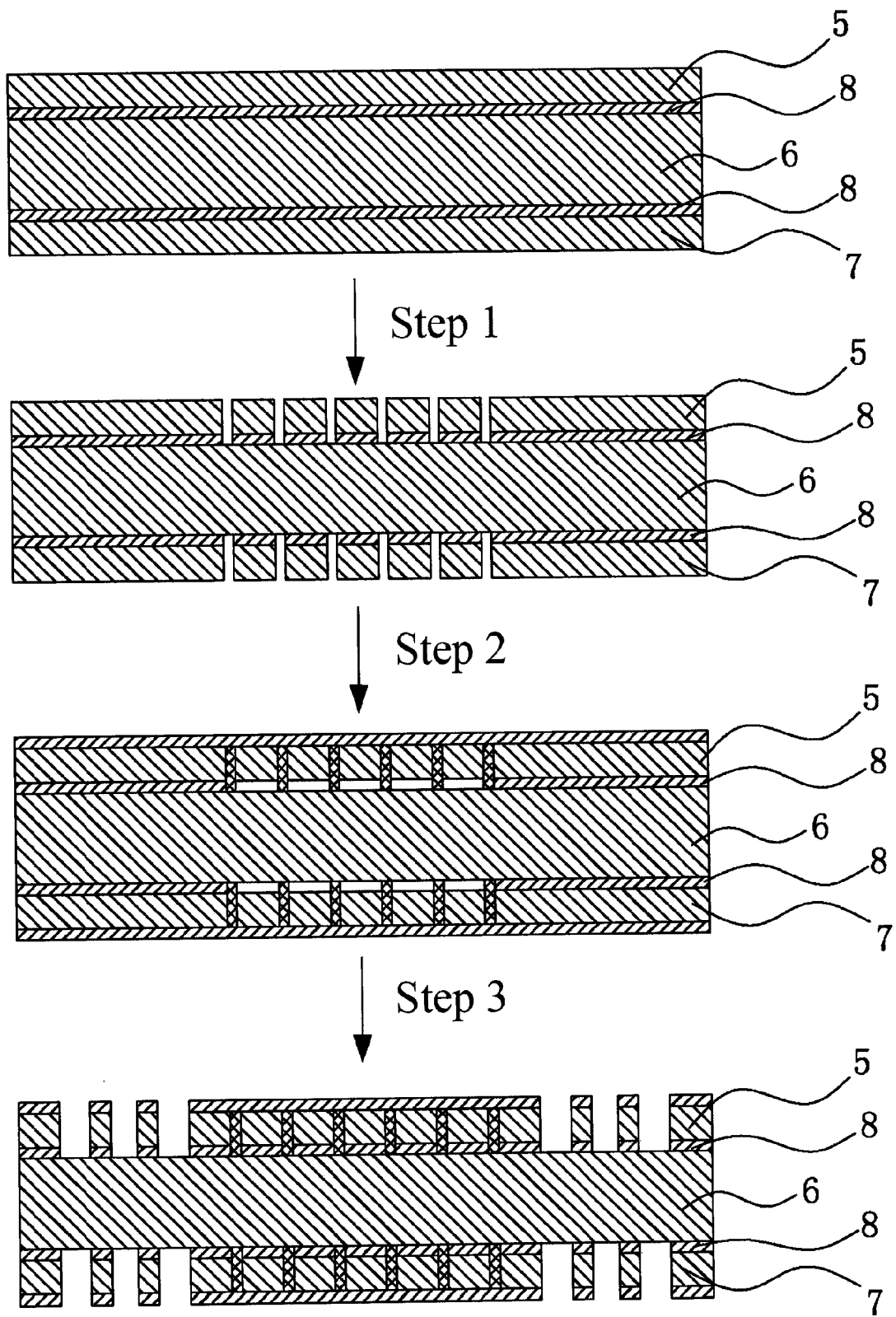
FIG. 4 is a diagram of step 1 to step 3 of the fabrication technique in accordance with the present invention.
Figure 5:
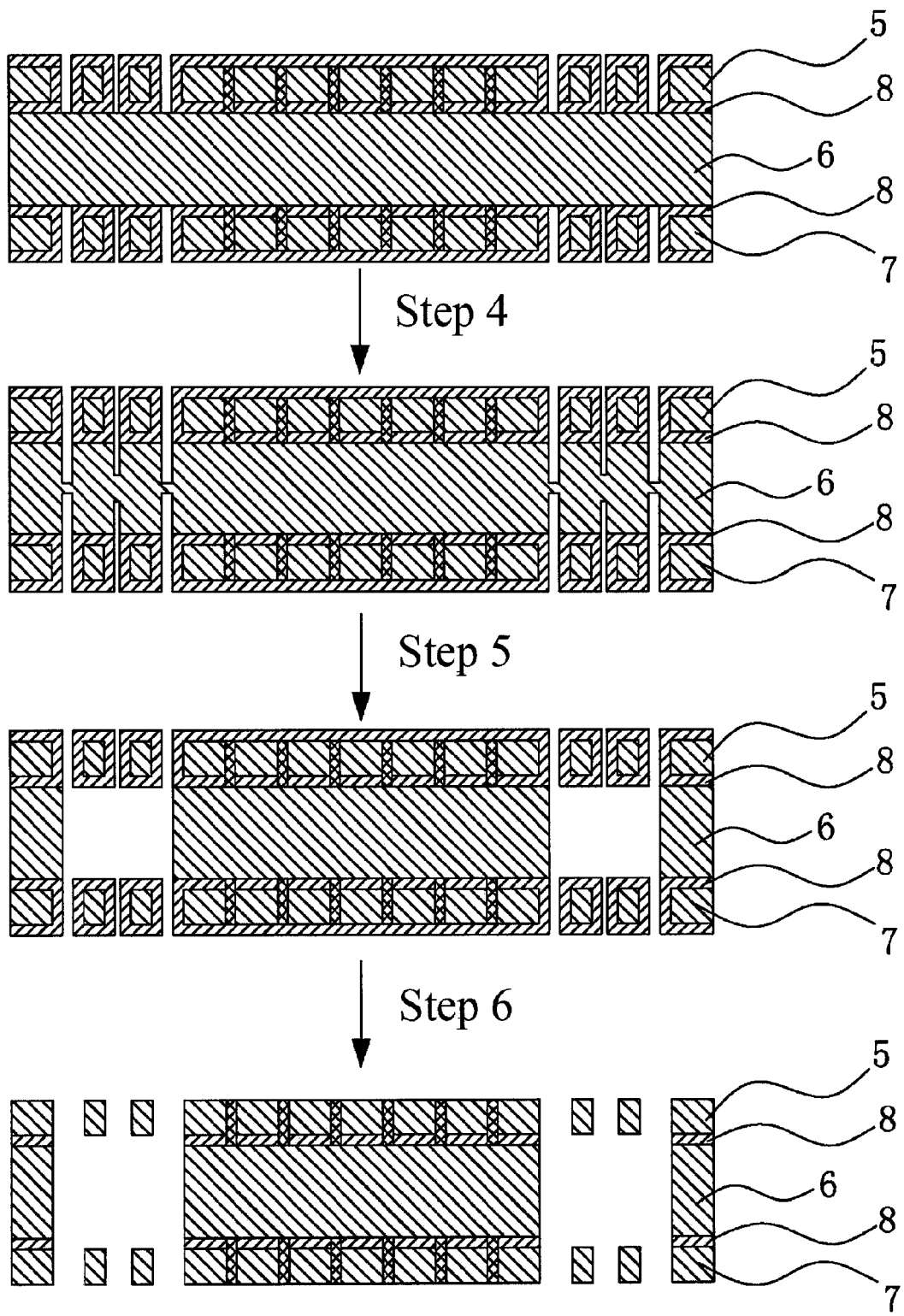
FIG. 5 is a diagram of step 4 to step 6 of the fabrication technique in accordance with the present invention.
Figure 6:
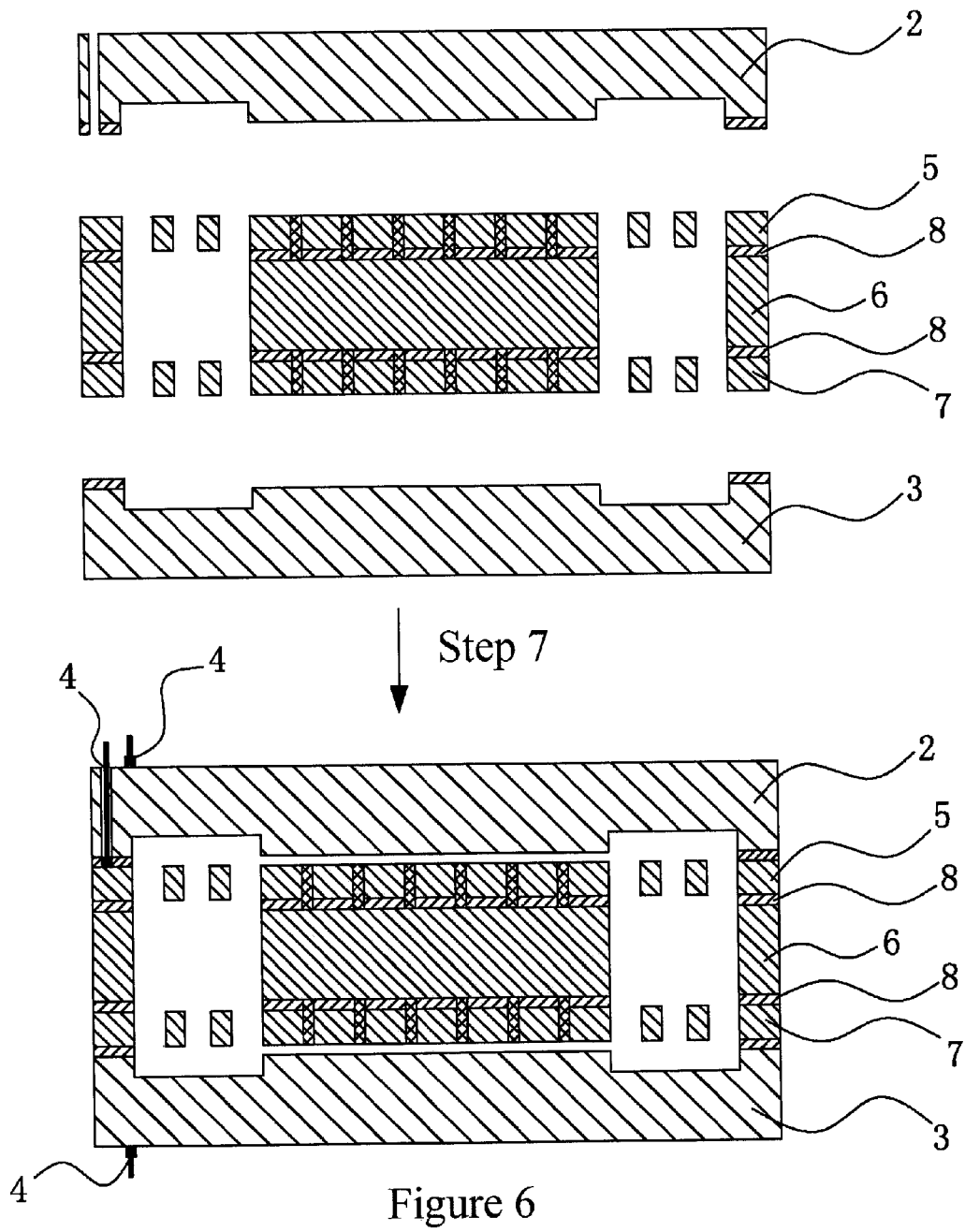
FIG. 6 is a diagram of step 7 of the fabrication technique in accordance with the present invention.

Next, the fabrication technique for the accelerometer disclosed in the present invention is described with reference to FIG. 4, FIG. 5, and FIG. 6, which includes the following steps:

Step 1: coat a layer of photoresist on the surface of the top silicon layer 5 and the bottom silicon layer 7 of the double side SOI silicon wafer. Then expose the top silicon layer 5 and the bottom silicon layer 7 according to certain patterns, and develop the patterns with developers to make the patterns apparent. After that, etch the exposed part of the top silicon layer 5 and the bottom silicon layer 7 to the silicon dioxide layer 8 by using the deep reactive ion etching. The exposed part of the silicon dioxide layer 8 is further etched using the dry reactive ion etching or buffered hydrofluoric acid. And form a plurality of holes, which are deep to the middle silicon layer 6. The photoresist is removed afterwards.

Step 2: deposit polycrystalline silicon to fill up the holes and to form an electric circuit; grow a layer of silicon dioxide on the surfaces of the top silicon layer 5 and the bottom silicon layer 7. Then polish the surfaces of the top silicon layer 5 and the bottom silicon layer 7 by chemical or mechanical polishing technique in order to meet the smoothness requirement.

Step 3: coat a layer of photoresist on the surface of the top silicon layer 5 and the bottom silicon layer 7. Then expose the top silicon layer 5 and the bottom silicon layer 7 according to certain patterns, and develop the patterns with developers to make the patterns apparent. First etch the exposed part of the grown silicon dioxide layer using dry reactive ion etching or buffered hydrofluoric acid. Then etch the top silicon layer 5 and the bottom silicon layer 7 to the silicon dioxide layer 8 using deep reactive ion etching. Finally etch the exposed part of the silicon dioxide layer using dry reactive ion etching or buffered hydrofluoric acid, which forms a plurality of resilient beams 13, range-of-motion stops 12, and connection beams 15. A layer of silicon dioxide is either grown or chemical vapor deposited (CVD) on top of the resilient beams 13, range-of-motion stops 12, and connection beams 15.

Step 4: etch to remove the exposed part of the silicon dioxide layer 8 by using dry etching method. Then deep etch the middle silicon layer 6 to a certain depth by using silicon deep reactive ion etching or gaseous xenon difluoride.

Step 5: etch the middle silicon layer 6, which has been etched to a certain depth, in both horizontal and vertical directions by using potassium hydroxide, or tetramethylammonium hydroxide, or ethylenediamine pyrocatechol, or gaseous xenon difluoride. The etching time is controlled based on the size of the region to be etched away in the middle silicon layer 6. After the middle silicon layer 6 is etched, two layers of free-moving resilient beams 13, range-of-motion stops 12, and connection beams 15 are formed.

Step 6: etch away the silicon dioxide exposed on the silicon surface by using buffered hydrofluoric acid, 49% hydrofluoric acid, or gaseous hydrogen fluoride.

Step 7: Perform a one-step-bonding to the top cap silicon wafer, the processed double side SOI silicon wafer and the bottom cap silicon wafer.

The fabrication technique of the accelerometer disclosed in the present invention further includes the following steps:

The fabrication technique for the top cap silicon wafer and bottom cap silicon wafer also includes:

A. before bonding with the double side SOI silicon wafer, coat photoresist on the top cap silicon wafer 2 or the bottom cap silicon wafer 3; then expose according to certain patterns, and develop with developer to make the patterns apparent. Etch the exposed portion of the top cap silicon wafer 2 or the bottom cap silicon wafer 3 until the silicon dioxide layer 8 is exposed by using deep reactive ion etching method, potassium hydroxide, tetramethyl ammonium hydroxide, or ethylenediamine phosphorus hydroquinone. Then further etch the exposed portion of the silicon dioxide layer 8 to form a through hole by using buffered hydrofluoric acid, 49% hydrofluoric acid, or gaseous hydrogen fluoride. The photoresist is removed in the end.

B. coat photoresist on the top cap silicon wafer 2 and the bottom cap silicon wafer 3; then expose according to certain patterns, and develop with developers to make the patterns apparent. Respectively etch the exposed portion of the top cap silicon wafer 2 and the bottom cap silicon wafer 3 to a certain depth by using deep reactive ion etching method, potassium hydroxide, tetramethylammonium hydroxide, or ethylenediamine pyrocatechol, to thereby respectively form a recess area on each bonding surface of top cap silicon wafer 2 and bottom cap silicon wafer 3.

C. clean the top cap silicon wafer 2 and the bottom cap silicon wafer 3 before bonding with the double side SOI silicon layer.

D. after boding with the double side SOI silicon wafer, deposit metal on the surfaces of the top cap silicon wafer 2 and bottom cap silicon wafer 3 to form electrodes 4; deposit metal on the surface of double side SOI silicon wafer through the through hole formed on either the top cap silicon wafer 3 or bottom cap silicon wafer 4 to form an electrode 4 through the through hole.

The silicon dioxide layers mentioned in the above fabrication technique serve the purpose of protecting the silicon layers, which are covered up by the silicon dioxide layers, from etching or corrosion.

The deep etching method and etching method mentioned in the present invention includes one or more of the following methods: dry etching or wet etching. The said dry etching includes, silicon deep reactive-ion etching and reactive-ion etching.

The material, equipment, and techniques used in the present invention have been disclosed by prior arts, but the accelerometer is dramatically improved by using these material and techniques, particularly by using the double side SOI silicon wafer. The resilient beams 13 and the mass 14, formed by etching the double side SOI silicon wafer, are accurately aligned and form a high symmetrical structure. Compared with the prior art, which fabricates the two level beams by bonding, the accelerometer fabricated using the present technique has higher accuracy and small error; the throughput yield also increases. Since the etching technique process is relatively simple, the present fabrication technique process also has high production efficiency and low manufacturing cost. Furthermore, the geometry and vibration modes of the present accelerometer are symmetrical, which further increases the measurement accuracy. By adding the range-of-motion stops 12 between the mass 14 and the support frame 11, the present invention not only reduces the effect of package-induced stress on the accelerometer while packaging; it also reduces the effect of thermal stress induced by the temperature change in the working environment on the accelerometer. Therefore, the present accelerometer is more stable.

The invention claimed is:

1. An accelerometer, comprising:
    a support frame;
    a first mass symmetrically disposed relative to and within the support frame;
    a plurality of resilient beams symmetrically disposed within the support frame relative to the first mass, each resilient beam positioned between the first mass and the support frame and adjacent a different portion of the first mass, each resilient beam having an E-shape structure with a middle beam and two end beams, each middle beam is connected to the first mass; and
    a plurality of range-of-motion stops symmetrically disposed within the support frame relative to the first mass, each range-of-motion stop positioned adjacent to and connected to the end beams of two different resilient beams, each range-of-motion stop connected to the first mass by a connection beam.

2. An accelerometer according to claim 1, wherein a plurality of recesses are provided on the first mass, and each range-of-motion stop is located within a recess.

3. An accelerometer according to claim 2, wherein a gap is formed between the first mass and each range-of-motion stop.

4. An accelerometer according to claim 1, wherein a gap space is formed between the support frame and the first mass, each resilient beam is provided within the gap space, and the resilient beams can move freely within the gap space.

5. An accelerometer according to claim 1, wherein the middle beam of each resilient beam is located across the midline of the first mass.

6. An accelerometer according to claim 1, wherein each connection beam is coupled to a corner of each range-of-motion stop, and each connection beam is coupled with an internal corner of the support frame.

7. An accelerometer according to claim 1, wherein the measurement mass has a double-sided silicon on insulator structure, which includes a top silicon layer, a middle silicon layer, and a bottom silicon layer, with a silicon dioxide layer provided between the top and middle silicon layers and between the bottom and middle silicon layers.

8. An accelerometer according to claim 7, wherein the resilient beams, the range-of-motion stops, and the connection beams are each symmetrically formed in the top silicon layer and the bottom silicon layer to compose a double layer structure.

9. An accelerometer according to claim 1, wherein a first electrode is coupled with the measurement mass, a second electrode is coupled with the top cap silicon wafer, and a third electrode is coupled with the bottom cap silicon wafer.

10. The accelerometer of claim 1, further comprising:
    the first mass being formed in multiple silicon layers; and
    the plurality of resilient beams, the plurality of range-of-motion stops, and the connection beams, are symmetrically formed in each of the multiple silicon layers.

11. An accelerometer, comprising:
    a measurement mass assembly contained within a support frame, the measurement mass including:
        a first mass symmetrically disposed relative to the support frame,
        a plurality of range-of-motion stops symmetrically disposed within the support frame relative to the first mass, and
        a plurality of resilient beams symmetrically disposed within the support frame relative to the first mass, wherein each resilient beam is positioned adjacent a different portion of the first mass and has an E-shaped structure with a middle beam and two end beams, wherein the middle beam of each resilient beam is connected to the first mass and the two end beams of each resilient beam are connected to two different adjacent range-of-motion stops;
    a top cap silicon wafer coupled with the measurement mass;
    a bottom cap silicon wafer coupled with the measurement mass; and
    a plurality of connection beams coupled between the range-of-motion stops and the support frame.

12. The accelerometer of claim 11, further comprising a plurality of recesses formed on the first mass, wherein each range-of-motion stop is located within one of the recesses.

13. The accelerometer of claim 11, further comprising a gap space formed between the support frame and the first mass, wherein each resilient beam is provided within the gap space, and the resilient beams are able to move freely within the gap space.

14. The accelerometer of claim 11, wherein the measurement mass has a double side silicon on insulator structure including a top silicon layer, a middle silicon layer, a first silicon dioxide layer between the top silicon layer and the middle silicon layer, a bottom silicon layer, and a second silicon dioxide layer between the middle silicon layer and the bottom silicon layer.

* * * * *